US008836713B2

(12) United States Patent
Caskey et al.

(10) Patent No.: US 8,836,713 B2
(45) Date of Patent: Sep. 16, 2014

(54) DRIVING AND SYNCHRONIZING MULTIPLE DISPLAY PANELS

(75) Inventors: Mark S. Caskey, San Diego, CA (US); Sten Jorgen Ludvig Dahl, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 451 days.

(21) Appl. No.: 12/716,507

(22) Filed: Mar. 3, 2010

(65) Prior Publication Data

US 2011/0216082 A1 Sep. 8, 2011

(51) Int. Cl.
*G09G 5/395* (2006.01)
*G09G 5/399* (2006.01)
*G06F 3/14* (2006.01)
*G09G 5/12* (2006.01)

(52) U.S. Cl.
CPC ........ *G06F 3/1446* (2013.01); *G09G 2300/026* (2013.01); *G09G 5/399* (2013.01); *G09G 5/12* (2013.01)
USPC .............................. 345/560; 345/539; 345/1.1

(58) Field of Classification Search
CPC .. G06F 3/1446; G09G 2300/026; G09G 5/12; G09G 5/399
USPC ............................................ 345/1.1–2.3, 560
See application file for complete search history.

(56) References Cited

U.S. PATENT DOCUMENTS

| | | | | |
|---|---|---|---|---|
| 5,212,742 | A * | 5/1993 | Normile et al. | 382/166 |
| 5,485,215 | A * | 1/1996 | Meyer et al. | 348/423.1 |
| 6,583,771 | B1 | 6/2003 | Furuhashi et al. | |
| 6,999,045 | B2 * | 2/2006 | Cok | 345/1.3 |
| 7,161,557 | B2 * | 1/2007 | Thornton | 345/2.1 |
| 2006/0214902 | A1 | 9/2006 | Tamura | |
| 2007/0063922 | A1 * | 3/2007 | Kim et al. | 345/1.1 |
| 2007/0279315 | A1 * | 12/2007 | Laves et al. | 345/1.1 |
| 2008/0079658 | A1 * | 4/2008 | Naito et al. | 345/2.2 |
| 2009/0094658 | A1 * | 4/2009 | Kobayashi | 725/118 |

FOREIGN PATENT DOCUMENTS

| | | |
|---|---|---|
| EP | 1380937 A1 | 1/2004 |
| EP | 1785981 A1 | 5/2007 |
| JP | 2004046186 A | 2/2004 |
| JP | 2006276221 A | 10/2006 |
| KR | 20070028839 A | 3/2007 |

OTHER PUBLICATIONS

International Search Report and Written Opinion—PCT/US2011/027083, ISA/EPO—May 27, 2011.

* cited by examiner

*Primary Examiner* — Kee M Tung
*Assistant Examiner* — Sing-Wai Wu
(74) *Attorney, Agent, or Firm* — Jeffrey D. Jacobs (57) ABSTRACT

A method for synchronization of data over multiple panels is provided. A communications apparatus that synchronizes data across multiple displays is provided. A computer program product, comprising a computer-readable medium that synchronizes video data across multiple displays is provided. At least one processor configured to synchronize data across multiple panels is provided. The video data can be sent between the multiple panels or displays at different rates to facilitate synchronization of the data. Double buffering at each panel can allow data to be written to a first buffer and at substantially the same time data is extracted from a second buffer and written to a display.

29 Claims, 6 Drawing Sheets

DRIVING AND SYNCHRONIZING MULTIPLE DISPLAY PANELS

BACKGROUND

1. Field

The following description relates generally to communication devices and more particularly to devices that employ multiple displays to output data.

2. Background

Communication systems are widely deployed to provide various types of communication content, such as voice, data, video, and so forth, and to communicate information regardless of where a user is located (e.g., inside or outside a structure) and whether a user is stationary or moving (e.g., in a vehicle, walking). These systems may be multiple-access systems capable of supporting communication with multiple users by sharing the available systems resources (e.g., bandwidth and transmit power). Multiple-access systems include Frequency Division Multiple Access (FDMA) systems, Time Division Multiple Access (TDMA) systems, Code Division Multiple Access (CDMA) systems, Orthogonal Frequency Division Multiple Access (OFDMA) systems, Third Generation Partnership Project (3GPP) Long Term Evolution (LTE) systems, and others.

People are relying on mobile devices for almost all their communication needs, and, as such, there are more functions available on these mobile devices today then there were even five years ago. These multiple functions are limited by the size of a screen (or display) associated with the mobile device. Thus, the user interface has become a bottleneck as it relates to the consumer experience. To mitigate this bottleneck, mobile devices are now being equipped with additional displays that can be connected to the mobile device. The additional displays can be used when a larger screen size experience is desired.

A problem associated with the additional screens is that the screens must be synchronized so that any data being displayed appears as a single, large display. This becomes an even larger problem when the additional displays have physical limitations, such as hinges, through which signals need to pass in order for the data to be presented on each display.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with synchronization of video, rendered across multiple panels, with few signal lines, which can be suitable for going through connections, such as hinges, for example. Further, the multiple displays are scalable, wherein adding more displays does not require the addition of more signaling lines.

An aspect relates to a method for synchronization of data over multiple panels. Method comprises receiving, at a first panel, data intended for the multiple panels. The data is received at a first rate. Method also comprises partitioning the data to remove a first subset of data and sending a second subset of data to a second panel. The second subset of data is sent at a second rate. Method further includes updating a display with the first subset of data.

An aspect relates to a communications apparatus that comprises a memory and a processor. Memory retains instructions related to receiving video data at a first rate and removing at least a first portion of the video data. Memory also retains instructions related to conveying at least a second portion of the video data to a next panel at a second rate and updating a display based on a local timing signal that is generated from a master timing signal received from a main controller. Processor is coupled to memory and is configured to execute instructions retained in memory.

An aspect relates to a communications apparatus that synchronizes data across multiple displays. Communications apparatus comprises means for receiving at a first rate data that is to be output on the multiple displays and means for removing a subset of the received data. Also included is means for sending a remaining portion of the received data to at least a second display. The remaining portion is sent at a data rate that is a function of the first rate. Communications apparatus also includes means for generating a local timing signal based on a master timing signal and means for outputting the subset of received data to a first display based on the local timing signal. According to some aspects, communications apparatus includes means for serializing the remaining portion of the received data. In accordance with some aspects, communications apparatus comprises means for writing the subset of the received data to a first buffer and means for extracting data from a second buffer to write to the first display. The first buffer and the second buffer can be line buffers or frame buffers.

An aspect relates to a computer program product, comprising a computer-readable medium. Included in computer-readable medium is a first set of codes for causing a computer to receive video data at a first rate and a second set of codes for causing the computer to remove at least a first portion of the video data. Also included in computer-readable medium is a third set of codes for causing the computer to convey at least a second portion of the video data to a next panel at a second rate. Computer-readable medium also includes a fourth set of codes for causing the computer to update a display based on a local timing signal.

An aspect relates to at least one processor configured to synchronize data across multiple panels. Processor includes a first module that receives, at a first panel, data intended for the multiple panels. The data is received at a first rate. Processor also includes a second module that partitions the data to remove a first subset of data and a third module that sends a second subset of data to a second panel, wherein the second subset of data is sent at a second rate. Also included in processor is a fourth module that updates a display with the first subset of data.

To the accomplishment of the foregoing and related ends, one or more aspects comprise features hereinafter fully described and particularly pointed out in the claims. The following description and annexed drawings set forth in detail certain illustrative features of one or more aspects. These features are indicative, however, of but a few of various ways in which principles of various aspects may be employed. Other advantages and novel features will become apparent from the following detailed description when considered in conjunction with the drawings and the disclosed aspects are intended to include all such aspects and their equivalents.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing these aspects.

Figure 1:
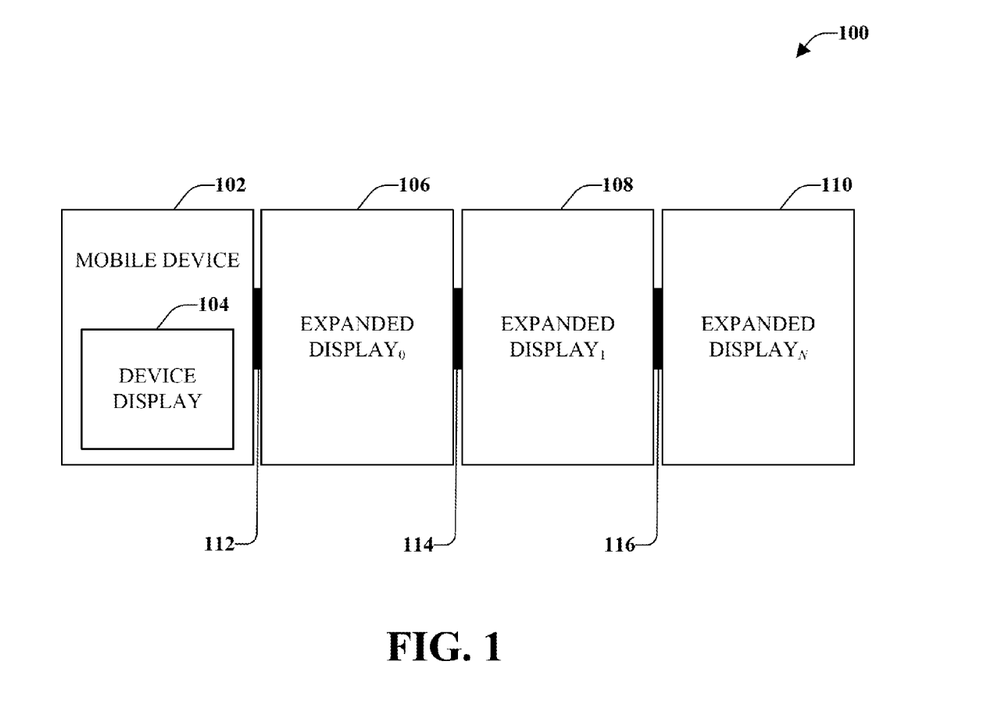
FIG. 1 illustrates a system for providing multiple displays with a single device, according to an aspect.

With reference to FIG. 1, illustrated is a system 100 for providing multiple displays with a single device, according to an aspect. System 100 includes a mobile device 102 that can be communicatively connected with one or more additional displays. These additional displays can be peripheral displays, wherein mobile device 102 includes a display 104 that can be used to output content (e.g., data, video, and so forth) for consumption by a user. Due to the footprint size of most mobile devices, the size of display 104 might be limited. However, there might be times when a user of mobile device 102 wants to see the output without being restricted to the small display 104. In this case, one or more additional displays can be activated. These expanded displays are labeled $display_0$ 106, $display_1$ 108, through $display_N$ 110, where N is an integer.

There can be various configurations for multiple displays associated with a single device. Although one or more particular configurations for displays may be shown and described herein, it should be understood that various other configurations can be utilized to associate multiple displays with a single device and the configurations illustrated are for purposes of explaining the disclosed aspects. Further, although configurations are illustrated with a particular number of displays, there can be fewer or more displays than the number of displays shown and described herein.

In accordance with some aspects, additional displays are an integral portion of mobile device 102. However, according to other aspects, one or more additional displays are separate components and can be detached from mobile device 102. According to another aspect, mobile device 102 and one or more additional displays can be separated from each other and operatively connected though a connection means that connects both physical components as well as necessary circuitry. For example, if a user wants to activate additional displays, the user can selectively disengage additional displays from mobile device 102, such as by unfolding displays (if displays are stored in a folded state). In another example, the user can selectively connect each screen to mobile device 102 and to each other to achieve the expanded screen size.

When additional displays are unfolded, connected, or attached to mobile device 102, there can be hinges or other connection means 112, 114, 116 though which signals need to pass in order for the output to be rendered on each additional display.

A challenge associated with a single device (e.g., one controller) having multiple display architectures is that video (or other data being displayed or rendered to the user) is partitioned over multiple displays and should remain synchronized to provide the user with a single screen. If display panels are separated by connectors, such as hinges, these physical limitations can reduce the number of signals that can pass between panels (e.g., displays). Conventional serial interfaces are not configured to synchronize video across multiple panels. Instead, conventional serial interfaces are designed for a one-to-one configuration (e.g., one controller to one panel architecture).

The disclosed aspects include one or more external controllers that accept a video stream from a source. The external controllers buffer, partition, serialize, and synchronize transmissions to multiple panels. Further, external controller logic at each recipient panel de-serializes (if necessary) and synchronizes transmission to a respective local panel.

Figure 2:
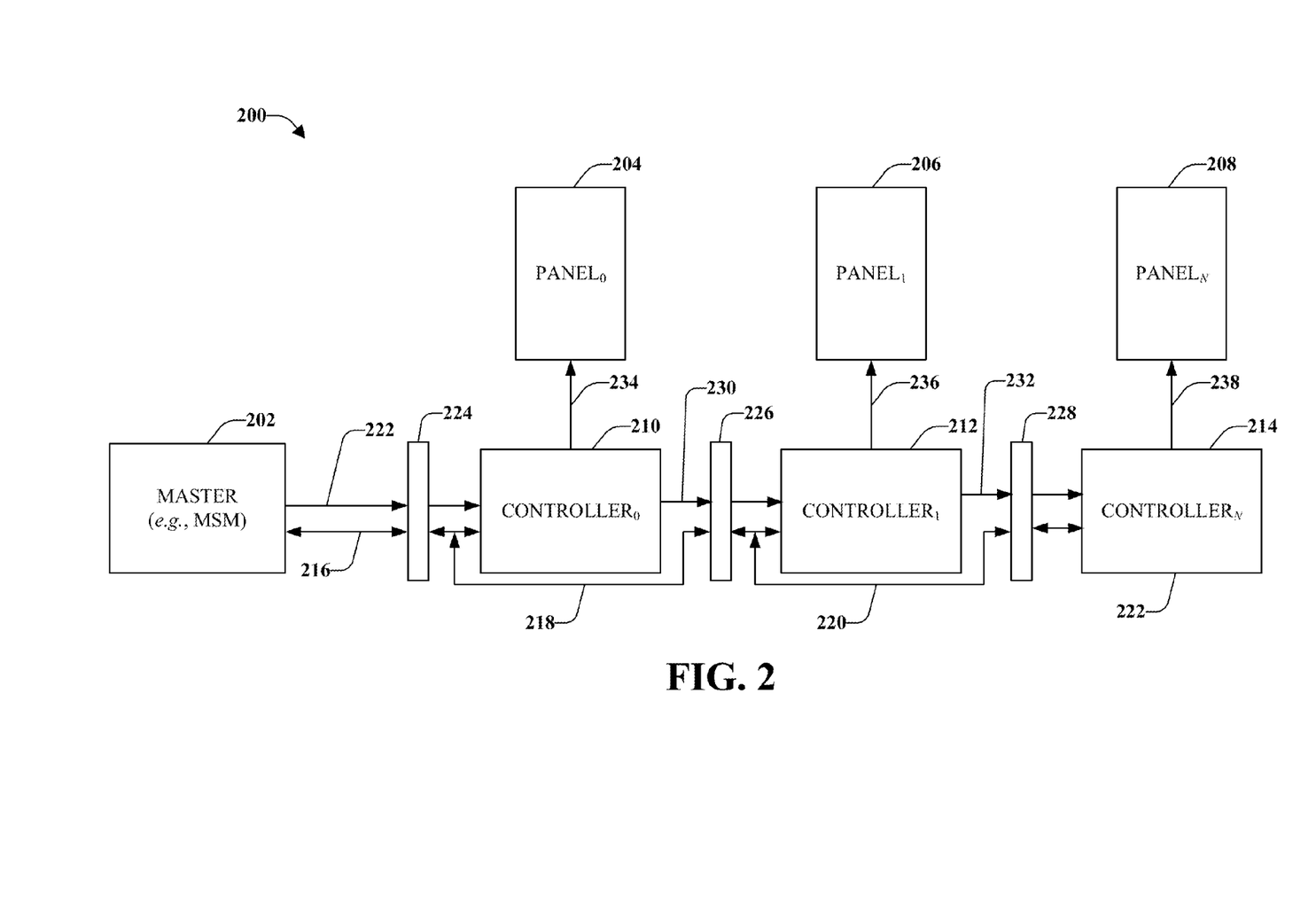
FIG. 2 illustrates an example system that is configured to synchronize video over multiple panels, according to an aspect.

FIG. 2 illustrates an example system 200 that is configured to synchronize video over multiple panels, according to an aspect. When a single controller attempts to drive multiple displays in order to render video that covers the multiple displays, it can be difficult to synchronize the output (e.g., picture) so that the video appears in synchronization across the multiple displays. The video is partitioned over the multiple displays and should remain synchronized to provide a good user experience. When the display panels are separated by various physical connections (e.g., hinges or another connection means), the number of signal lines between controller and panels are limited, which introduces a challenge as it relates to synchronizing across multiple panels. Existing serial interfaces, suitable for going through physical limitations (such as hinges), are not set up to synchronize video across multiple panels. Instead, such serial interfaces are designed for one control to one panel architectures (e.g., a one-to-one configuration).

In order to achieve better synchronization across multiple panels, system 200 includes external controllers that are added in order to serialize and de-serialize the video data. Each controller selects the data for a respective panel and can retain synchronization between panels within acceptable limits for what a human eye can detect.

System 200 includes a communications apparatus, illustrated as a master controller or MSM 202, that includes a display (e.g., device display). MSM 202 can be associated with multiple panels, labeled $Panel_0$ 204, $Panel_1$ 206, through $Panel_N$ 208, where N is an integer. Also illustrated are control lines 216, 218, 220, 222. Although four panels (e.g., MSM 202, $Panel_0$ 204, $Panel_1$ 206, and $Panel_N$ 208) are illustrated, the disclosed aspects can be applied to any number of panels. There is a controller associated with each panel. The controller could be external to the panel or internal to the panel. This example shows external controllers. External $controller_0$ 210 is associated with $Panel_0$ 204, $controller_1$ 212 is associated with $Panel_1$ 206, and $controller_N$ 214 is associated with $Panel_N$ 208. The various panels can be separated by connection means 224, 226, 228.

Video interface 222 (e.g., from liquid crystal display controller (LCDC) to external $controller_0$ 210) supplies video data as if MSM 202 is driving one large panel. For example, video interface 222 can be, but is not limited to, Mobile Industry Processor Interface (MIPI), Mobile Display Digital Interface (MDDI), or Red, Green, Blue (RGB) interface.

$Controller_0$ 210 double buffers the data, which allows data from MSM 202 to be written into a first buffer while data is extracted from a second buffer to be written to the panels (e.g., $Panel_0$ 204, through $Panel_N$ 208). In accordance with some aspects, buffer is a line buffer that buffers data on a line-by-line basis. According to other aspects, buffer is a frame buffer that buffers data on a frame-by-frame basis. If controller$_O$ 210 contains one or more frame buffers, it allows MSM 202 to go into sleep mode if there is no new data to be sent to the screen (e.g., the data from the display controllers is refreshing the panels by repeatedly sending the same information, without any action from MSM 202).

Data that is extracted and to be written to the other panels can be serialized and shifted to the next panel, and to subsequent panels. The synchronization is performed by ensuring that the individual panel controllers write data to their respective panels simultaneously (or substantially simultaneously).

Controller$_O$ 210 serializes video data 230 to Panel$_1$ 206 and Panel$_N$ 208. Controller$_1$ 212 and controller$_N$ 214 de-serialize video data and drive respective panels (e.g., Panel$_1$ 206 and Panel$_N$ 208). Data 232 for Panel$_N$ 208 is sent from Panel$_1$ controller 212, after Panel$_1$ controller 212 has removed its respective portion of the data.

Controller$_O$ 210, controller$_1$ 212, and controller$_N$ 214 provide timing signals to their respective panels (over respective video interfaces 234, 236, 238) such that the video is synchronized across all panels. The incoming data from MSM 202 is stored locally by the controllers on the local panels and driven to the local displays such that the data displayed on the panels is synchronized.

Controllers on each panel provide timing signals to the panel. Controllers on different panels do not need to communicate to each other but can by synchronized by the main controller or MSM 202.

Figure 3:
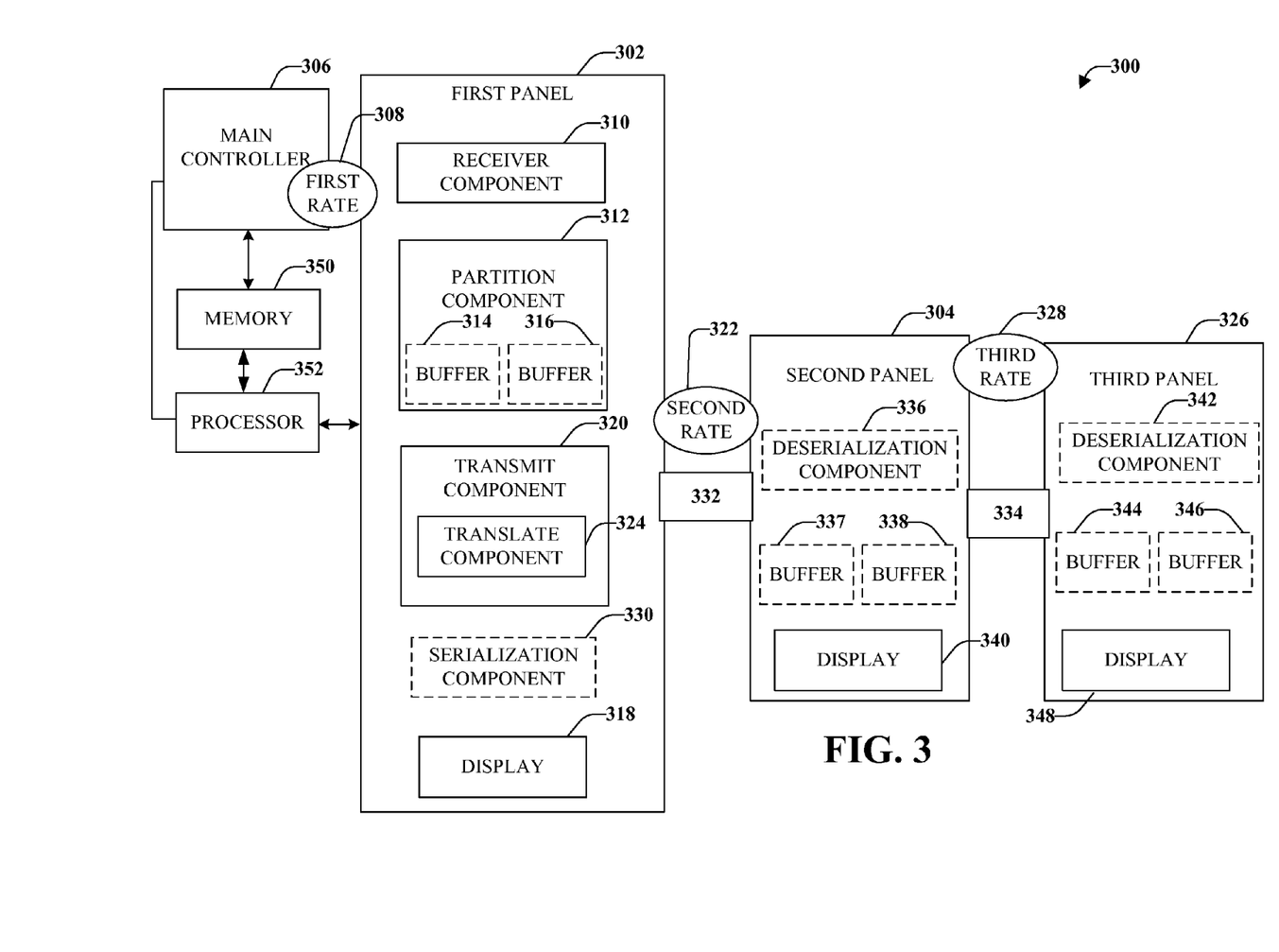
FIG. 3 illustrates a system for synchronization of data over multiple panels, according to an aspect.

FIG. 3 illustrates a system 300 for synchronization of data over multiple panels, according to an aspect. System 300 can be utilized in a wireless communication environment or a wired communication environment and can include a wireless communication apparatus, referred to as a first panel 302. Alternatively, communication apparatus can be wired.

First panel 302 can be configured to receive data intended for multiple panels (or displays). For example, first panel 302 can be associated with a number of other panels, one of which is illustrated as second panel 304. First panel 302 can receive data from a main controller 306, which can be external to first panel 302 (e.g., integrated on another device) or integrated with first panel 302 (e.g., integrated on the same device).

Data can be received at a first rate 308. In accordance with some aspects, main controller 306 is not aware that there are multiple panels on which data will be displayed. Thus, main controller 306 is unaware that the data is going to three panels and that synchronization is required and sends data as if first panel 302, second panel 304, and third panel 326 are one large display. For example, a receiver component 310 can receive data from main controller 306 at a rate that is based on multiplying the large display size (e.g., the pixel size of the displays multiplied by the number of displays) by the number of bytes needed for each pixel and by the rate at which the panels are driven.

Included in first panel 302 is a partition component 312 that is configured to remove a first subset of data from the received data. First subset of data can be a first portion of received data. For example, if there are four panels, partition component 312 can be configured to remove the first quarter of the data (e.g., one fourth of the data).

In accordance with some aspects, partition component comprises a first buffer 314 and a second buffer 316 in order to double buffer first subset of data. Double buffering the data comprises writing the first portion of received data to first buffer 314 and extracting data from second buffer 316. The data extracted from second buffer 316 is written to a display 318. After all the data has been extracted from second buffer 316, the buffers reverse roles in a continuous manner. For example, data written to first buffer 314 is extracted and written to a display 318 and the first portion of received data is written to second buffer 316.

First buffer 314 and second buffer 316 can be line buffers or frame buffers. If the buffers are line buffers, the first portion of each line (or respective portions of each line) is removed on a line-by-line basis. If the buffers are frame buffers, the first portion of each frame (or respective portions of each frame) is removed on a frame-by-frame basis.

A transmit component 320 can send a second subset of data, which can comprise the data remaining after removal of first subset of data, to second panel 304. To send second subset of data, transmit component 320 can determine a second rate 322 at which second subset of data should be sent. To determine second rate 322, a translate component 324 can reduce first rate 308 in proportion to the amount of data that is being sent to the remaining panels. For example, if there are three panels, two thirds of the remaining data (after first panel 302 has removed is respective portion) is to be sent to the remaining panels. Therefore, second rate 322 is two thirds of first rate.

In another example, if there are four panels, then second rate is three-quarters of first rate. If there are five panels, second rate 322 is four-fifths of first rate 308, and so forth.

In a more detailed example, there are three panels (first panel 302, second panel 304, and third panel 326) and each panel includes a 272×480 display. Main controller 306 is not aware that there are three panels. Instead, main controller 306 is only aware that it is driving a large screen (e.g., 816×480 display). The large screen size is determined by taking the number of screens (in this example 3) and multiplying by the number of pixels (in this example 272), resulting in 816 (3*272). The screens are driven at 60 Hz and each of the 816×480 pixels requires three bytes. Thus, first rate 308 is determined by multiplying the large display size (816×480) by three bytes by 60 Hz (816*480*3*60) or 70502400 Bytes per second (Bps). Since there are three panels, one third of the data goes to each panel. One third of the data goes to first panel 302 and the other two thirds goes to second panel 304 and third panel 326. Continuing the example, second rate 322 is 47001600 Bps (two-thirds of first rate 308). Third rate 328 is half of second rate 322, or one third of first rate 308, and will be 23500800 Bps.

In accordance with some aspects, first panel 302 includes a serialization component 330 that is configured to serialize second subset of data before the data is sent to second panel 304. Serialization of data allows the data to be sent over physical connection means 332, 334 (e.g., hinges). Second panel 304 comprises a de-serialization component 336 that is configured to de-serialize the received second subset of data. Second panel 304 can also include double buffers 337, 338 and a display 340. Third panel 326 can also include a de-serialization component 342, double buffers 344, 346 and a display 348. Double buffers 336, 338, 344, 346 operate similar to first buffer 314 and second buffer 316.

Second panel 304 removes at least a portion of the second subset of data (e.g., data that is to be displayed by second panel 304). The remainder of the data is sent to third panel 326 (or subsequent panels) and the data that is to be displayed by third panel 326 (or subsequent panels) is removed. Third rate 328 can be utilized to transfer the subset of data from second panel 304 to third panel 326. Third rate 328 is a function of the data rate translation based on the number of panels included in system 300 and based on first rate 308 and/or second rate 322. In this example with three panels, third rate 328 is half of second rate 322 (or one third of first rate 308).

The data is sent to the different panels at different rates to provide the resultant data to the multiple panels in synchronization so that the lines are being drawn on the multiple panels (or frames updated to multiple panels) at about the same rate. This rate synchronization can mitigate tearing, misalignment, or unusual distracting actions that might be rendered on each display, which can be detected by the human eye.

In a line buffer example, first panel 302 takes the first subset of data, which is the amount of data appropriate for first buffer 314 and second buffer 316. For example, if first panel 302 is 200 pixels wide and main controller 306 sends 600 pixels, first panel 302 takes the first 200 pixels (e.g., pixels 1 to 200) as the first subset of data. Second panel 304 chooses the second portion of pixels (e.g., pixels 201 to 400) and third panel 326 chooses the third portion of pixels (e.g., pixels 401 to 600). If an entire frame is sent, a similar division of the frame occurs. In accordance with some aspects, panels may store a whole buffer and play back the entire buffer. According to some aspects, a segment of a line might be stored and the remainder of the line is sent to subsequent panels.

System 300 can include memory 350 operatively coupled to main controller 306. Memory 350 can be external to main controller 306 or can reside within main controller 306. Memory 350 can store information related to data synchronization and other suitable information related to signals transmitted and received in a communication network.

Memory 350 can store protocols associated with data synchronization, taking action to control communication between main controller 306 and first panel 302 (e.g., data transfer from memory through main controller 306 to first panel 302). Memory 350 can also store protocols associated with taking action to control communication between main controller 306 and other components (e.g., panels), such that system 300 can employ stored protocols and/or algorithms to achieve improved communications in a wireless or wired network as described herein. It should be appreciated that data store (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

In accordance with some aspects, memory 350 retains instructions related to receiving video data at a first rate and removing at least a first portion of the video data. Memory 350 also retains instructions related to conveying at least a second portion of the video data to a next panel at a second rate and updating a display based on a local timing signal that is generated from a master timing signal received from a main controller.

Additionally, memory 350 retains instructions related to determining a data rate as a function of a quantity of panels associated with the main controller, a pixel size of displays associated with the panels, and a number of bytes for each pixel.

In accordance with some aspects, memory 350 retains instructions related to writing the video data to a first buffer and extracting the video data from a second buffer to send to the display. According to some aspects, the first buffer and the second buffer are line buffers that are updated on a line-by-line basis. According to some aspects, the first buffer and the second buffer are frame buffers that are updated on a frame-by-frame basis.

Additionally, memory 350 retains instructions related to receiving the master timing signal from the main controller. Memory 350 also retains instructions related to referencing the master timing signal to generate a local timing signal, and updating the display at a time that is synchronized with at least the next panel.

At least one processor 352 can be operatively connected to main controller 306, memory 350 and/or first panel 302 to facilitate analysis of information related to data synchronization in a communication network. Processor 352 can be a processor dedicated to analyzing and/or generating information received by main controller 306 and/or first panel 302, a processor that controls one or more components of system 300, and/or a processor that both analyzes and generates information received by main controller 306 and/or first panel 302 and controls one or more components of system 300.

In accordance with some aspects, processor 352 is configured to synchronize data across multiple panels. Processor 352 can include a first module that receives, at a first panel, data intended for the multiple panels. The data is received at a first rate. Also included is a second module that partitions the data to remove a first subset of data and a third module that sends a second subset of data to a second panel, wherein the second subset of data is sent at a second rate. Processor 352 also includes a fourth module that updates a display with the first subset of data. In accordance with some aspects, processor 352 also includes a fifth module that determines the second rate in proportion to the first rate and a number of remaining panels.

Figure 4:
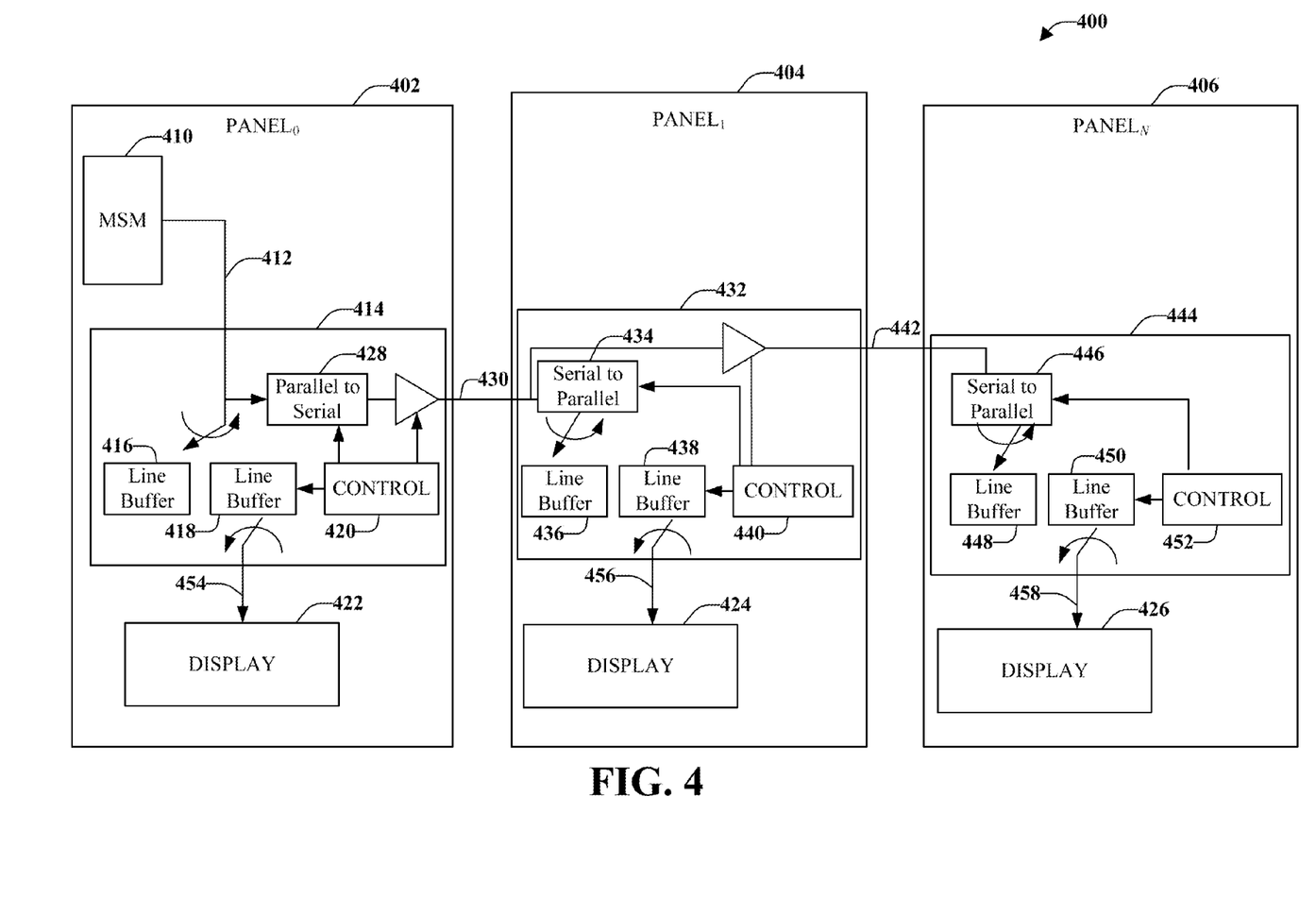
FIG. 4 illustrates an example system that describes a possible implementation of the disclosed aspects.

FIG. 4 illustrates an example system 400 that describes a possible implementation of the disclosed aspects. It should be noted that system 400 is illustrated for purposes of describing an example of the disclosed aspects and is not meant to limit the various aspects to this example.

System 400 includes three panels, labeled $Panel_0$ 402, $Panel_1$ 404, and $Panel_2$ 406 (although a different number of panels can be utilized). $Panel_0$ 402 can include a generic controller or, as illustrated, a Mobile Station Modem (MSM 410). MSM 410 sends data, in this example, over a RGB interface 412, which is a parallel interface that can be utilized for driving liquid crystal display (LCD) panels. Although an RGB interface 412 is shown, MSM 410 can support other interfaces.

Also included in $Panel_0$ 402 is a programmable logic device, which can be a field-programmable gate array (FPGA 414), as illustrated, or another device (e.g., complex programmable logic device (CPLD), application-specific integrated circuit (ASIC), programmable logic controller (PLC), and so forth).

Some of the data is deposited in alternating line buffers 416, 418. As a stream of data is written into a line buffer, a state machine (e.g., control block 420) is playing out data from the other line buffer into a display 422. The data rate (e.g., first rate) at which the data is received by FPGA 414 is different than the data rate at which control block 420 writes data to display 422. In this example, first rate is three times as fast (because there are three panels here) as the rate at which control block 420 writes data to display 422.

The functions performed by line buffers 416, 418 can alternate as part of a filtering operation. Data specific to display 422 is processed by line buffers 416, 418. Data intended for displays 424, 426 on Panel₁ 404 and Panel₂ 406 is sent to a parallel to serial converter 428. The data is serialized and sent across the hinge, illustrated at 430, at a first rate. In this example, the first rate is 400 Mbps.

The data arrives at a programmable logic device (e.g., FPGA 432) of Panel₁ 404. A serial to parallel converter 434 can perform a serial to parallel conversion on the data intended to be output on display 424. The data is sent to alternating line buffers 436, 438 and a state machine (control block 440) sends the data to display 424.

The data intended for Panel₂ 406 is sent across a hinge or other physical connection means, at 442 to an FPGA 444 (or other programmable logic device) and is processed through a serial to parallel converter 446, alternating line buffers 448, 450, and a state machine (control block 452). The data is output to a user on display 426.

As illustrated, the panels (Panel₀ 402, Panel₁ 404, and Panel₂ 406) are driven in synchronization across one line, which is written out across the three panels. For example, a top line of pixels is written to the panels, then the second line of pixels is written to the panels, then the third line of pixels is written to the panels, and so forth. Each panel is not updated independently with respect to the other panels but instead is updated line-by-line across the multiple displays. The updates occur at substantially the same time at all the panels.

In an alternative example, the line buffers 416, 418, 436, 438, 448, and 450 can be frame buffers. A first frame is written to the panels, then a second frame is written to the panels, and so on. Each panel is updated frame-by-frame across the multiple displays. The updates occur at substantially the same time at all the panels.

In the example of FIG. 4, displays 422, 424, 426 can be 272×480 displays. Processor Clock (PCLK), or first data rate, can calculated based on the equation 3 (displays)*272 (pixels)*480 (pixels) 80*1.2 (bytes for each pixel)=31.3 MHz. RGB interface 412 can send data at PCLK rate or 31.3 MHz. Data sent at RGB 1 (454) can be sent at a data rate of a local timing signal PCLK1, which is PCLK/3. Data sent at 430 is sent at about 400 Mbps and is data only for Panel₁ 404 and Panel_N 406. Data sent to display 424 at RGB 2 (456) is sent at a data rate of local timing signal PCLK2, which is equal to PCKL/3. Data sent at 442, is sent at a rate of approximately 200 Mps and is only data for Panel_N 406. Data is sent to display 426 over RGB3 (458) and is sent at a data rate of local clock PCLK3, which is equal to PCLK/3.

In view of exemplary systems shown and described above, methodologies that may be implemented in accordance with the disclosed subject matter, will be better appreciated with reference to various flow charts. While, for purposes of simplicity of explanation, methodologies are shown and described as a series of blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g. device, system, process, component). Additionally, it should be further appreciated that methodologies disclosed throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 5:
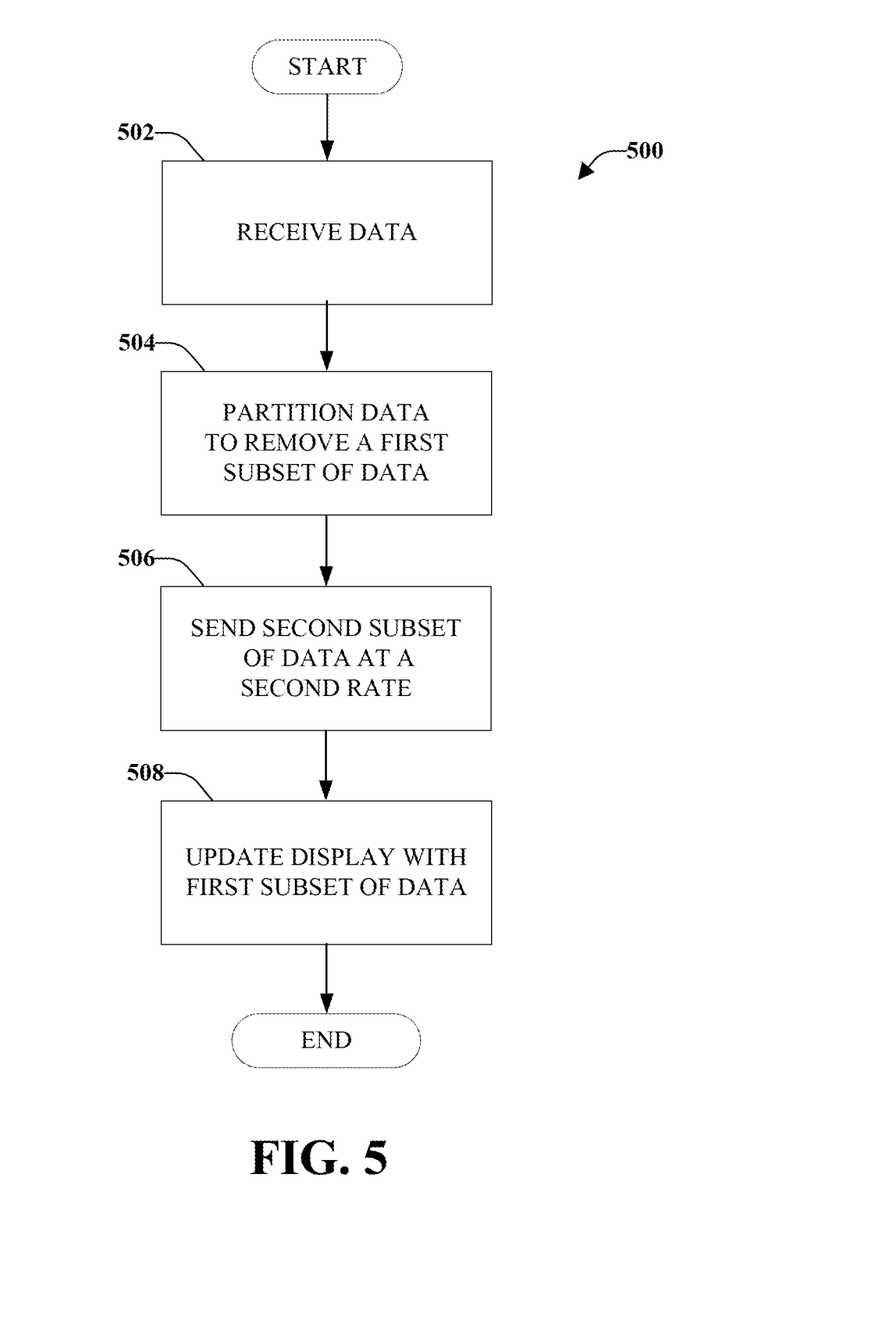
FIG. 5 illustrates a method for synchronization of data over multiple panels, according to an aspect.

FIG. 5 illustrates a method 500 for synchronization of data over multiple panels, according to an aspect. Method 500 can be performed by a first panel that is one panel included in the multiple panels. External controllers (in each panel) can be added in order to serialize and de-serialize video data (or other data that is to be output for consumption by a user). Each controller can select the data for its panel. Synchronization between panels can be maintained within acceptable limits for what a human eye can detect. Such synchronization can be achieved with few signal lines, which is suitable for traversing physical limitations, such as a connector between the panels. Further, the number of panels is scalable and adding more panels (or displays) does not require the addition of more signaling lines.

Method 500 starts, at 502, when data intended for the multiple panels is received. In accordance with some aspects, the data is video data. The data can be received from a mobile device that includes a main controller. In accordance with some aspects, the data can be received from a main controller that is an integral component of first panel. The data can be received at a first rate, which is a function of the number of displays, the pixel size of the displays, and the number of bytes needed for each pixel.

At 504, the received data is partitioned to remove a first subset of data. The first subset of data can be the data that is to be presented by first panel (e.g., on a display). For example, the first subset of data can be a first portion of a line or a first portion of a frame, depending on a buffer type.

In accordance with some aspects, the partitioning the data comprises double buffering the first subset of data. Double buffering can comprise writing the first subset of data to a first buffer and extracting data from a second buffer. The extracted data is written to the display of first panel. After all the data has been extracted from second buffer, the buffers change roles and data is written to second buffer and at substantially the same time, data is extracted from first buffer and written to the display. In accordance with some aspects, the data is written to the display at a different rate than the rate at which the data arrived (e.g., first rate).

According to some aspects, the partitioning comprises employing a line buffer to remove the first subset of data on a line-by-line basis. According to some aspects, the partitioning comprises employing a frame buffer to remove the first subset of data on a frame-by-frame basis.

The portion of the received data remaining after the first subset of data is removed is referred to as a second subset of data, regardless of the amount of data actually contained in the second subset. For example, second subset of data can comprise multiple portions of data, one portion for each panel remaining in the multiple panels. For example, if there are five panels, the first panel removes one-fifth of the data (as the first subset of data) and the second subset of data is the remaining four-fifths of data. The second subset of data is sent to the remaining panels, at 506.

Second subset of data can be sent at a second rate. Second rate can be established by determining a number of remaining panels (e.g., the number of panels not including first panel) and utilizing the number of remaining panels to establish the second rate. Thus, second rate is in proportion to the number of remaining panels. Referring again to the five panel example, second rate is fourth-fifths of first rate.

In accordance with some aspects, method 500 includes serializing the second subset of data before sending to the second panel. At 508, a display, associated with first panel, is updated with the first subset of data.

In accordance with some aspects, method 500 includes receiving a master timing signal, which can be received from a main controller. Local timing signals are generated at each of the first panel and the second panel. The local timing signals are referenced to the master timing signal. Further, the local timing signals are referenced to update the display at time that is synchronized with second panel (and subsequent panels) based on the local timing signal generated by second panel (and subsequent panels). Second panel (and subsequent panels) receive respective master timing signal from main controller.

Method 500 can continue at second panel by obtaining the second subset of data. A portion of the second subset of data (appropriate for second panel) is removed. The remaining portion of second subset of data is conveyed to a third panel at a third rate. Third rate can be determined by a data rate translation, which is in proportion to the number of remaining panels (e.g., not including first panel and second panel). Referring again to the five panel example, third rate is three-fifths of first rate. The removed portion is output to a second panel display. Timing signal (received from main controller) can be referenced to update the display at time that is synchronized with the other panels. Alternatively, state machines running on the panels can be configured to ensure that all display updated are synchronized across all panels. In accordance with some aspects, method includes de-serializing the removed portion before outputting the second portion to second panel display.

In accordance with some aspects, a computer program product can include a computer-readable medium that comprises codes for carrying out various aspects of method 500. Computer-readable medium can include a first set of codes for causing a computer to receive video data at a first rate and a second set of codes for causing the computer to remove at least a first portion of the video data. Computer-readable medium also includes a third set of codes for causing the computer to convey at least a second portion of the video data to a next panel at a second rate and a fourth set of codes for causing the computer to update a display based on a local timing signal.

In accordance with some aspects, computer-readable medium further comprises a fifth set of codes for causing the computer to determine a quantity of displays associated with the main controller, a display size, and a byte size for each pixel of the display. Also included is a sixth set of codes for causing the computer to ascertain a data rate as a function of the quantity, the display size, and the byte size.

Figure 6:
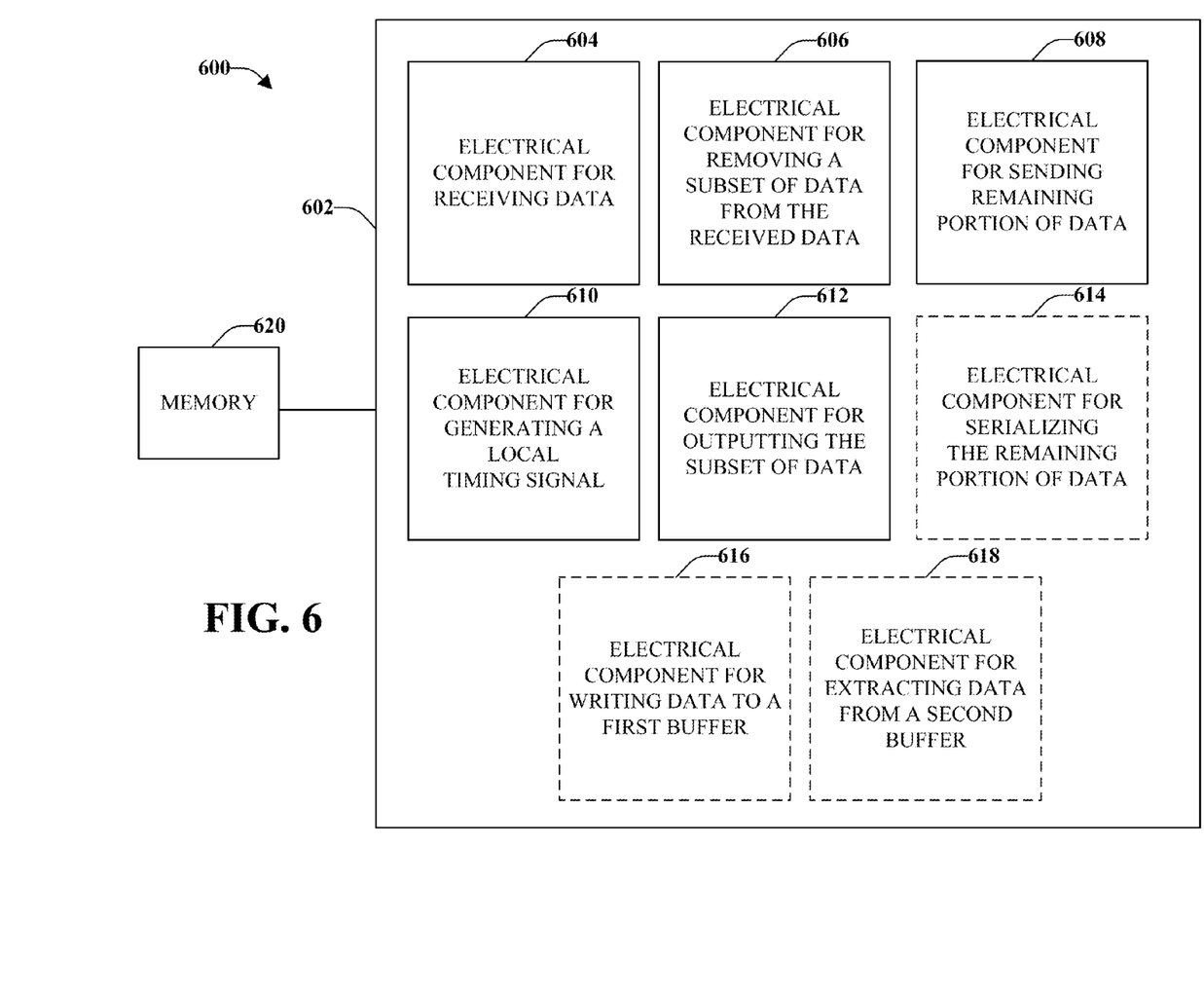
FIG. 6 illustrates an example system that synchronizes data across multiple displays, according to an aspect.

With reference to FIG. 6, illustrated is an example system 600 that synchronizes data across multiple displays, according to an aspect. System 600 may reside at least partially within a mobile device. It is to be appreciated that system 600 is represented as including functional blocks, which may be functional blocks that represent functions implemented by a processor, software, or combination thereof (e.g., firmware).

System 600 includes a logical grouping 602 of electrical components that can act separately or in conjunction. Logical grouping 602 may include an electrical component 604 for receiving at a first rate data that is to be output on the multiple displays. Also included is an electrical component 606 for removing a subset of the received data.

Logical grouping 602 also includes an electrical component 608 for sending a remaining portion of the received data to at least a second display. The remaining portion is sent at a data rate that is a function of the first rate. Also included is an electrical component 610 for generating a local timing signal based on a master timing signal and an electrical component 612 for outputting the subset of received data to a first display based on the local timing signal.

Additionally, logical grouping 602 can include an electrical component 614 for serializing the remaining portion of the received data. Additionally or alternatively, logical grouping 602 can include an electrical component 616 for writing the subset of the received data to a first buffer and an electrical component 618 for extracting data from a second buffer to write to the display. In accordance with some aspects, the first buffer and the second buffer are line buffers. According to some aspects, the first buffer and the second buffer are frame buffers.

Additionally, system 600 can include a memory 620 that retains instructions for executing functions associated with electrical components 604, 606, and 608 or other components. While shown as being external to memory 620, it is to be understood that one or more of electrical components 604, 606, and 608 may exist within memory 620.

It is to be understood that aspects described herein may be implemented by hardware, software, firmware or any combination thereof. When implemented in software, functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various illustrative logics, logical blocks, modules, and circuits described in connection with aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor may be a microprocessor, but, in the alternative, processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described herein.

For a software implementation, techniques described herein may be implemented with modules (e.g., procedures, functions, and so on) that perform functions described herein. Software codes may be stored in memory units and executed by processors. Memory unit may be implemented within processor or external to processor, in which case memory unit can be communicatively coupled to processor through various means as is known in the art. Further, at least one processor may include one or more modules operable to perform functions described herein.

Techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. Further, CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform functions described herein.

Further, the steps and/or actions of a method or algorithm described in connection with aspects disclosed herein may be embodied directly in hardware, in a software module executed by a processor, or a combination thereof. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to processor, such that processor can read information from, and write information to, storage medium. In the alternative, storage medium may be integral to processor. Further, in some aspects, processor and storage medium may reside in an ASIC. Additionally, ASIC may reside in a user terminal. In the alternative, processor and storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

While the foregoing disclosure discusses illustrative aspects and/or embodiments, it should be noted that various changes and modifications could be made herein without departing from the scope of described aspects and/or embodiments as defined by the appended claims. Accordingly, described aspects are intended to embrace all such alterations, modifications and variations that fall within scope of appended claims. Furthermore, although elements of described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used in this application, the terms "component", "module", "system", and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. Components may communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a mobile device. A mobile device can also be called, and may contain some or all of the functionality of a system, subscriber unit, subscriber station, mobile station, mobile, wireless terminal, node, device, remote station, remote terminal, access terminal, user terminal, terminal, wireless communication device, wireless communication apparatus, user agent, user device, or user equipment (UE), and the like. A mobile device can be a cellular telephone, a cordless telephone, a Session Initiation Protocol (SIP) phone, a smart phone, a wireless local loop (WLL) station, a personal digital assistant (PDA), a laptop, a handheld communication device, a handheld computing device, a satellite radio, a wireless modem card and/or another processing device for communicating over a wireless system. Moreover, various aspects are described herein in connection with a base station. A base station may be utilized for communicating with wireless terminal(s) and can also be called, and may contain some or all of the functionality of, an access point, node, Node B, e-NodeB, e-NB, or some other network entity.

Various aspects or features will be presented in terms of systems that may include a number of devices, components, modules, and the like. It is to be understood and appreciated that various systems may include additional devices, components, modules, and so forth, and/or may not include all devices, components, modules, and so on, discussed in connection with the figures. A combination of these approaches may also be used.

Additionally, in the subject description, the word "exemplary" (and variants thereof) is used to mean serving as an example, instance, or illustration. Any aspect or design described herein as "exemplary" is not necessarily to be construed as preferred or advantageous over other aspects or designs. Rather, use of the word "exemplary" is intended to present concepts in a concrete manner.

What is claimed is:

1. A method for synchronization of data over multiple panels, comprising:
receiving, at a first panel of a mobile device, data intended for the multiple panels including receiving the data at a first rate;
partitioning the data to remove a first subset of data;
sending a second subset of data to an expanded peripheral second panel detachable from the mobile device, the second panel configured to be selectively connected to the mobile device to expand the mobile device's screen size, including sending the second subset of data at a second rate, reduced from the first rate, to facilitate synchronization of the data provided to each of the first and second panels, the second rate determined, at least in part, as a function of the first rate, number of pixels of the second panel, number of bytes per pixel, and number of frames per second to be displayed on the first and second panels, the determined second rate causing lines to be drawn on the first panel and the second detachable panel connected to the mobile device at about the same rate by receiving data for a particular display line at substantially the same time at respective receiving buffers of the first and second panels; and
updating a display with the first subset of data;
wherein the second panel is connectable to a detachable expanded peripheral third panel, each of the second panel and the third panel configured, when connected, to determine number of detachable expanded panels respectively connected to the second panel and to the third panel, to determine a corresponding data rate for serially transmitting display data to the respectively connected detachable expanded panels based on the determined number of respectively connected detachable expanded panels, and to serially transmit the display data, according to the determined data rate, to the respectively connected detachable expanded panels via connection means for physically connecting the second and third panels to their respective detachable expanded panels.

2. The method of claim 1, wherein the sending comprises determining a number of remaining panels and utilizing the number of remaining panels to establish the second rate, and wherein the sending at the second rate includes sending at a rate in proportion to the number of remaining panels.

3. The method of claim 1, wherein the partitioning comprises double buffering the first subset of data.

4. The method of claim 3, wherein the double buffering comprises:
writing the first subset of data to a first buffer; and
extracting data from a second buffer; and
writing the data from the second buffer to the display.

5. The method of claim 1, further comprising:
serializing the second subset of data before sending to the second panel.

6. The method of claim 1, wherein the partitioning comprises employing a line buffer to remove the first subset of data on a line-by-line basis.

7. The method of claim 1, wherein the partitioning comprises employing a frame buffer to remove the first subset of data on a frame-by-frame basis.

8. The method of claim 1, further comprising:
receiving a master timing signal;
generating local timing signals at each of the first panel and the second panel referenced to the master timing signal; and
referencing the local timing signal to update the display at time that is synchronized with the second panel based on the local timing signal generated by the second panel.

9. The method of claim 1, further comprising:
obtaining, at the second panel, the second subset of data;
removing a portion of the second subset of data;
conveying a remaining portion of the second subset of data to a third panel at a third rate; and
outputting the removed portion to a second panel display.

10. The method of claim 9, further comprising:
de-serializing the removed portion before the outputting.

11. The method of claim 1, wherein the first panel is coupled to the second panel through one or more connectors.

12. The method of claim 11, wherein at least one of the first panel and the second panel is a foldable panel such that the at least one of the first and second panel is activated when unfolded.

13. The method of claim 11, wherein the second subset of data is sent to the second panel across the one or more connectors.

14. The method of claim 11, wherein the one or more connectors include hinges.

15. A communications apparatus, comprising:
a memory that retains instructions related to receiving video data at a first rate, removing at least a first portion of the video data, conveying at least a second portion of the video data at a second rate, reduced from the first rate, to a next expanded peripheral panel detachable from the apparatus, the next panel configured to be selectively connected to the apparatus to expand the apparatus' screen size, to facilitate synchronization of the data provided to each of the apparatus and the next panel, and updating a display based, at least in part, on a local timing signal that is generated from a master timing signal received from a main controller, wherein the second rate is determined, at least in part, as a function of the first rate, number of pixels of the next panel, number of bytes per pixel, and number of frames per second to be displayed on the apparatus and the next panel, the determined second rate causing lines to be drawn on a panel of the apparatus and on the next detachable panel connected to the apparatus at about the same rate by receiving data for a particular display line at substantially the same time at respective receiving buffers of the panel of the apparatus and the next panel; and
a processor, coupled to the memory, configured to execute the instructions retained in the memory;
wherein the next expanded peripheral panel is connectable to a further detachable expanded peripheral panel, each of the next panel and the further panel configured, when connected, to determine number of detachable expanded panels respectively connected to the next panel and to the further panel, to determine a corresponding data rate for serially transmitting display data to the respectively connected detachable expanded panels based on the determined number of respectively connected detachable expanded panels, and to serially transmit the display data, according to the determined data rate, to the respectively connected detachable expanded panels via connection means for physically connecting the next panel and the further panel to their respective detachable expanded panels.

16. The communications apparatus of claim 15, wherein the memory retains instructions related to determining a data rate as a function of a quantity of panels associated with the main controller, a pixel size of displays associated with the panels, and a number of bytes for each pixel.

17. The communications apparatus of claim 15, the memory retains instructions related to writing the video data to a first buffer and extracting the video data from a second buffer to send to the display.

18. The communications apparatus of claim 17, wherein the first buffer and the second buffer are line buffers that are updated on a line-by-line basis.

19. The communications apparatus of claim 17, wherein the first buffer and the second buffer are frame buffers that are updated on a frame-by-frame basis.

20. The communications apparatus of claim 15, the memory retains instructions related to receiving the master timing signal from the main controller and referencing the master timing signal to generate a local timing signal, and updating the display at a time that is synchronized with at least the next panel.

21. A communications apparatus that synchronizes data across multiple displays, comprising:
means for receiving at a first rate data that is to be output on the multiple displays;
means for removing a subset of the received data;
means for sending a remaining portion of the received data to at least an expanded peripheral second display detachable from the apparatus, the second display configured to be selectively connected to the apparatus to expand the apparatus' screen size, the remaining portion is sent at a second data rate that is reduced from the first rate, to facilitate synchronization of the data provided to the apparatus and the second display, the second rate determined, at least in part, as a function of the first rate, number of pixels of the second display, number of bytes per pixel, and number of frames per second to be displayed on the apparatus and the second display, the determined second rate causing lines to be drawn on a display of the apparatus and the second detachable display connected to the apparatus at about the same rate by receiving data for a particular display line at substantially the same time at respective receiving buffers of the display of the apparatus and the second display;
means for generating a local timing signal based on a master timing signal; and
means for outputting the subset of received data to the first display based on the local timing signal;
wherein the second display is connectable to a detachable expanded peripheral third display, each of the second display and the third display configured, when connected, to determine number of detachable expanded displays respectively connected to the second display and to the third display, to determine a corresponding data rate for serially transmitting display data to the respectively connected detachable expanded displays based on the determined number of respectively connected detachable expanded displays, and to serially transmit the display data, according to the determined data rate, to the respectively connected detachable expanded displays via connection means for physically connecting the second and third displays to their respective detachable expanded displays.

22. The communications apparatus of claim 21, further comprising:
means for serializing the remaining portion of the received data.

23. The communications apparatus of claim 21, further comprising:
means for writing the subset of the received data to a first buffer; and
means for extracting data from a second buffer to write to the first display.

24. The communications apparatus of claim 23, wherein the first buffer and the second buffer are line buffers.

25. The communications apparatus of claim 23, wherein the first buffer and the second buffer are frame buffers.

26. A computer program product, comprising:
a non-transitory computer-readable medium comprising:
a first set of codes for causing a mobile computer device to receive video data at a first rate;
a second set of codes for causing the mobile computer device to remove at least a first portion of the video data;
a third set of codes for causing the mobile computer device to convey at least a second portion of the video data at a second rate, reduced from the first rate, to a next expanded peripheral panel detachable from the mobile computer device, the next panel configured to be selectively connected to the mobile computer device to expand the mobile computer device's screen size, to facilitate synchronization of the data provided to each of the mobile computer device and the next panel, the second rate determined, at least in part, as a function of the first rate, number of pixels of the next panel, number of bytes per pixel, and number of frames per second to be displayed on the mobile computer device and the next panel, the determined second rate causing lines to be drawn on a panel of the mobile computer device and the next detachable panel connected to the mobile computer device at about the same rate by receiving data for a particular display line at substantially the same time at respective receiving buffers of the panel of the mobile computer device and the next panel; and a fourth set of codes for causing the computer to update a display based on a local timing signal;

wherein the next expanded peripheral panel is connectable to a further detachable expanded peripheral panel, each of the next panel and the further panel configured, when connected, to determine number of detachable expanded panels respectively connected to the next panel and to the further panel, to determine a corresponding data rate for serially transmitting display data to the respectively connected detachable expanded panels based on the determined number of respectively connected detachable expanded panels, and to serially transmit the display data, according to the determined data rate, to the respectively connected detachable expanded panels via connection means for physically connecting the next panel and the further panel to their respective detachable expanded panels.

27. The computer program product of claim 26, the computer-readable medium further comprising:

a fifth set of codes for causing the computer to determine a quantity of displays associated with a main controller, a display size, and a byte size for each pixel of the display; and a sixth set of codes for causing the mobile computer device to ascertain a data rate as a function of the quantity, the display size, and the byte size.

28. At least one processor configured to synchronize data across multiple panels, comprising:

a first module that receives, at a first panel of a mobile device, data intended for the multiple panels, wherein the data is received at a first rate;

a second module that partitions the data to remove a first subset of data;

a third module that sends a second subset of data to an expanded peripheral second panel detachable from the mobile device, the second panel configured to be selectively connected to the mobile device to expand the mobile device's screen size, wherein the second subset of data is sent at a second rate, reduced from the first rate, to facilitate synchronization of the data provided to each of the first and second panels, the second rate determined, at least in part, as a function of the first rate, number of pixels of the second panel, number of bytes per pixel, and number of frames per second to be displayed on the first and second panels, the determined second rate causing lines to be drawn on the first panel and the second detachable panel connected to the mobile device at about the same rate by receiving data for a particular display line at substantially the same time at respective receiving buffers of the first and second panels; and a fourth module that updates a display with the first subset of data;

wherein the second panel is connectable to a detachable expanded peripheral third panel, each of the second panel and the third panel configured, when connected, to determine number of detachable expanded panels respectively connected to the second panel and to the third panel, to determine a corresponding data rate for serially transmitting display data to the respectively connected detachable expanded panels based on the determined number of respectively connected detachable expanded panels, and to serially transmit the display data, according to the determined data rate, to the respectively connected detachable expanded panels via connection means for physically connecting the second and third panels to their respective detachable expanded panels.

29. The at least one processor of claim 28, further comprising:

a fifth module that determines the second rate in proportion to the first rate and a number of remaining panels.

* * * * *